(12) United States Patent
Nusser et al.

(10) Patent No.: US 6,930,178 B2
(45) Date of Patent: Aug. 16, 2005

(54) 1:2 CHROMIUM COMPLEX DYES

(75) Inventors: Rainer Nusser, Neuenburg (DE);
Georg Schoefberger, Basel (CH);
Reinhard Pedrazzi, Allschwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/490,688

(22) PCT Filed: Sep. 26, 2002

(86) PCT No.: PCT/IB02/03977
§ 371 (c)(1),
(2), (4) Date: Mar. 24, 2004

(87) PCT Pub. No.: WO03/029357
PCT Pub. Date: Apr. 10, 2003

(65) Prior Publication Data
US 2004/0204572 A1 Oct. 14, 2004

(30) Foreign Application Priority Data
Sep. 27, 2001 (GB) .............................. 0123150

(51) Int. Cl.[7] .............................. C09B 45/48; D06P 1/10
(52) U.S. Cl. .............................. 534/588; 534/699; 8/466; 8/681; 8/685
(58) Field of Search .............................. 534/588, 699; 8/466, 681, 685

(56) References Cited

U.S. PATENT DOCUMENTS

| | | | |
|---|---|---|---|
| 2,933,488 A | * | 4/1960 | Biedermann et al. ....... 534/699 |
| 3,756,771 A | | 9/1973 | Beffa |
| 4,416,816 A | | 11/1983 | Grossmann |
| 4,469,485 A | | 9/1984 | Grossmann |
| 4,618,673 A | | 10/1986 | Dore |
| 4,820,309 A | | 4/1989 | Holliger |
| 5,008,379 A | | 4/1991 | Holliger |
| 5,123,930 A | | 6/1992 | Bitterli |
| 5,283,325 A | | 2/1994 | Bitterli |
| 5,401,834 A | | 3/1995 | Koerte |
| 5,667,534 A | | 9/1997 | Lehmann et al. |
| 5,853,431 A | | 12/1998 | Korte |
| 6,210,448 B1 | | 4/2001 | Korte |

FOREIGN PATENT DOCUMENTS

| | | |
|---|---|---|
| EP | 0718374 | 6/1996 |
| FR | 1232916 | 10/1960 |
| FR | 1585581 | 1/1970 |

* cited by examiner

Primary Examiner—Fiona T. Powers
(74) Attorney, Agent, or Firm—Antohony A. Bisulca

(57) ABSTRACT

The present invention relates to novel 1:2 chromium complex dyes, processes for their preparation and their use for dyeing or printing fiber materials containing hydroxyl groups or containing nitrogen.

The present invention relates to a 1:2 chromium complex dye of formula (I):

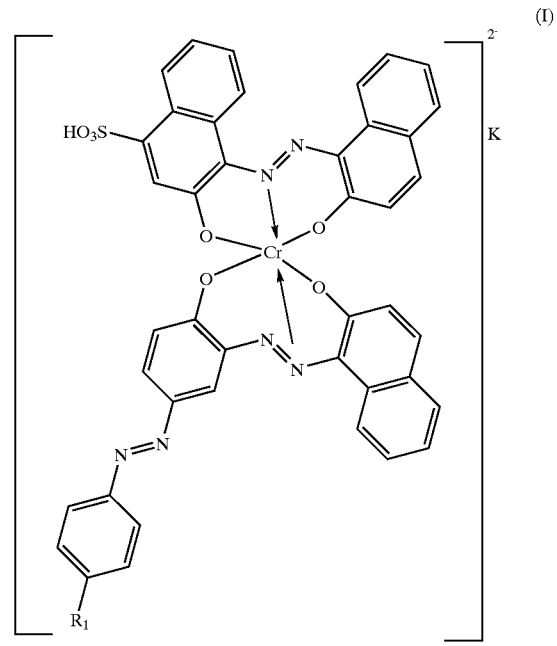

wherein all substituents are as defined in the claims, a process for their preparation and their use for dyeing or printing fiber materials containing hydroxyl groups or containing nitrogen.

8 Claims, No Drawings

1:2 CHROMIUM COMPLEX DYES

The present invention relates to novel 1:2 chromium complex dyes, processes for their preparation and their use for dyeing or printing fiber materials containing hydroxyl groups or containing nitrogen.

The invention relates to a 1:2 chromium complex dye of formula (I):

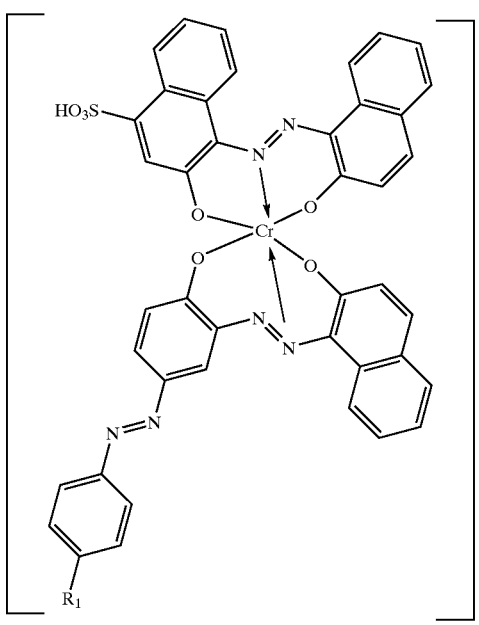

wherein $R_1$ is $O(CH_2)_nOR_2$ or $(CH_2)nOR_2$, $R_2$ is H; linear $C_{1-4}$alkyl; branched $C_{3-4}$alkyl or —$SO_3H$, n is 1, 2, 3 or 4 and K is a cation as well as mixtures thereof and/or salts thereof.

The linear or branched alkyl groups my be substituted or unsubstituted. Suitable substituents may be for example hydroxyl, halogens, such as Cl or Br or a sulpho-group In preferred compounds according to formula (I) $R_2$ is H; $C_{1-3}$alkyl or —$SO_3H$, and n is 1, 2, 3 or 4.

In more preferred compounds according to formula (I) $R_2$ is H; $CH_3$ or $CH_2CH_3$ and n is 2, 3 or 4.

Suitable cations K are alkali metal, alkaline earth metal, ammonium, alkanolammonium or alkylammonium cations. K can also be more than one cation, for example as in the case of monovalent cations. Examples of corresponding cations are the sodium, lithium or ammonium cations or mono-, di- or triethanolammonium cations.

A further embodiment of the present invention is a process for the production of compounds according to formula (I), which comprises reacting an azo compound of the formula (II):

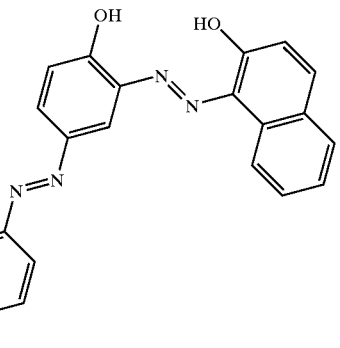

in which $R_1$ is defined as above
with a 1:1 chromium complex compound of the formula (III):

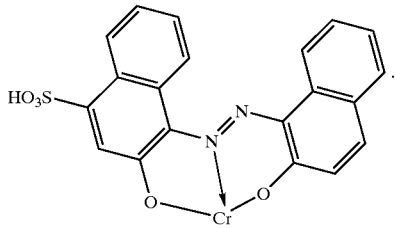

The reaction of the azo compound of the formula (III) with the 1:1 chromium complex compound of the formula (II) is carried out, for example, in an aqueous medium at a temperature of, for example, 40° C. to 130° C., in particular 70° C. to 100° C., at a pH of, for example, 8 to 14, in particular at a pH of 10 to 13. The reaction is advantageously carried out in the presence of an agent which neutralizes mineral acid or an alkaline agent, for example in the presence of an alkali metal carbonate, alkali metal acetate or alkali metal hydroxide, sodium being preferred as the alkali metal.

The compounds of the formulae (II) and (III) are known or can be obtained analogously to known processes.

Compounds of the formula (II) can be obtained by customary diazotization and coupling reactions. The diazotization is as a rule carried out by the action of nitrous acid in aqueous-mineral acid solution at a low temperature, for example 0° C. to 20° C., and the coupling is advantageously carried out at an alkaline pH, for example at a pH of 8 to 12.

1:1 chromium complex compounds of the formula (III) can thus be obtained in accordance with customary chroming processes, in which the reaction can be carried out with the chromium salt, for example in an aqueous medium, if appropriate under pressure, at a temperature of, for example, 90° C. to 130° C. Chromium salts are, for example, chromium(III) acetate, chromium(III) nitrate, chromium(III) chloride, chromium(III) salicylate or, in particular, chromium(III) sulfate.

A further embodiment of the invention is a process for dyeing or printing fiber materials containing hydroxyl groups or containing nitrogen.

Fiber materials are preferably either naturally occurring polyamide fiber materials, for example silk or, in particular, wool, or synthetic polyamide fiber materials, for example polyamide 6 or polyamide 6,6, or wool- or polyamide-containing blend fabric. Synthetic polyamide fiber materials are of particular interest here.

The above fiber material can be in the most diverse processing forms, for example as fiber, yarn, woven fabric or knitted fabric, and in particular in the form of carpets.

The dyeing or printing can be carried out in customary dyeing or printing apparatuses. The dye liquors or printing pastes can comprise further additives, for example wetting agents, antifoams, leveling agents or agents which influence the properties of the textile material, for example softening agents, additives for providing a flame-resistant finish or soil-, water- and oil-repellent agents, as well as water-softening agents and naturally occurring or synthetic thickeners, for example alginates and cellulose ethers.

In a preferred printing process, the padding method is used, for example pad-steam, pad-thermofix, pad-dry, pad-batch, pad-jig and pad-roll. Alternatively, printing may be carried out using ink-jet methods.

The 1:2 chromium complex dyes of the formula (I) according to the invention give level dyeings with good all-round properties. The 1:2 chromium complex dyes of the formula (I) according to the invention is also suitable as a component in a dyeing mixture.

The examples below serve to illustrate the invention. Unless stated otherwise, the percentages are by weight, and the degrees are given in Celsius.

EXAMPLE 1A

A solution of 71.7 parts of 1-acetylamino-2-hydroxybenzene in 200 parts of water at 0–5° C. are mixed with a diazonium salt solution formed at 0–5° C. and a pH of 1 from a mixture of 76.6 parts of 4-amino-1-(2'-hydroxyethoxy)-benzene and 125 parts by volume of 4N sodium nitrite solution. During the coupling reaction the pH is maintained at 12–13 by the continuous adding of a 30% sodium hydroxide solution. At the end of the reaction the product obtained is salted out, filtered by suction and dried. The still damp residue after suction filtration is dissolved in 550 parts of 4% by weight solution of sodium hydroxide and the resultant solution is heated to 90–100° C. until the saponification of the acetyl group is complete as determined by thin layer chromatography. Then the solution is neutralized with hydrochloric acid, salted-out, filtered by suction and dried. The compound thus obtained having the formula (IIa):

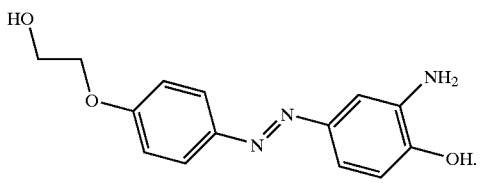

(IIa)

EXAMPLE 1B 136.6 parts of the monoazo-compound obtained according to Example 1a is dissolved in 300 parts of water and diazotized by the method described in Example 1a. 72.0 parts of 2-hydroxy-naphthalene is dissolved in a mixture of 300 parts of water and 100 parts of a 30% sodium hydroxide solution. Then the diazo-compound is added during 1 h and at 20–25° C. to this solution. At the same time a 30% sodium hydroxide solution is added continuously in order to maintain the pH of the mixture at 12–13. After coupling reaction is completed the bisazo compound thus formed is salted-out using conventional methods, filtered and dried at 60° C. under vacuum. The product has the formula (IIb):

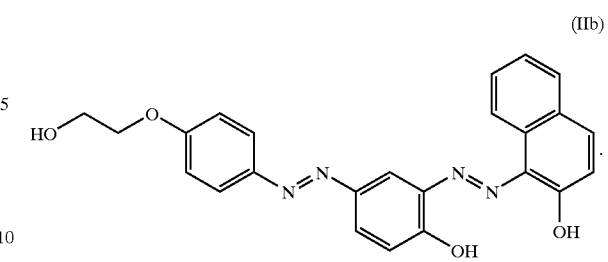

(IIb)

EXAMPLE 1C 214.2 parts of the bisazo-compound obtained according to Example 1b is suspended in 1300 parts of water at 75–80° C. and a pH of 11–12. To this mixture 248.5 parts of the 1:1 chromium complex having the formula (IIIa):

(IIIa)

obtained by conventional methods, is added while stirring. At the same time the pH is kept at 11 by the addition of a 30% sodium hydroxide solution. After reaction is completed the resulting 1:2 chromium complex is salted-out using conventional methods, filtered and dried at 60° C. under vacuum. The end product conforms to the formula (IV):

(IV)

and dyes wool and synthetic polyamides to a black shade. Dyeings thus obtained display excellent light and wet fastness properties.

EXAMPLES 2–11

Table 1 discloses several dyestuffs which are formed according to the method analogous to this described in Examples 1a to 1c employing corresponding starting materials. In all cases the dyestuff obtained dyes wool and synthetic polyamides to a black shade and dyeings thus obtained display excellent light and wet fastness properties.

TABLE 1

[Chemical structure: Chromium complex dye with two azo groups, featuring R-substituted phenyl azo naphthol and sulfonated naphthol azo naphthol ligands coordinated to Cr, with 2 Na⁺ counterions, overall charge 2−]

| Example | R |
|---|---|
| 2 | —CH$_2$CH$_2$OH |
| 3 | —CH$_2$OH |
| 4 | —CH$_2$CH$_2$CH$_2$OH |
| 5 | —CH$_2$CH$_2$CH$_2$CH$_2$OH |
| 6 | —OCH$_2$CH$_2$OCH$_3$ |
| 7 | —OCH$_2$CH$_2$OCH$_2$CH$_3$ |
| 8 | —CH$_2$CH$_2$OCH$_3$ |
| 9 | —CH$_2$CH$_2$OCH$_2$CH$_3$ |
| 10 | —OCH$_2$CH$_2$OSO$_3$H |

Application Example A

A dyebath at 40° C., consisting of 2000 parts of water, 1 part of a weakly cation-active leveling agent which is based on an ethoxylated aminopropyl fatty acid amide and which has affinity for dye, 1.5 parts of the dye of Example 1 and adjusted to pH 6 with 0.5 parts of 40% acetic acid is entered with 100 parts of nylon-6 fabric. After 10 minutes at 40° C., the dyebath is heated to 98° C. at a rate of 1° C. per minute and then left at the boil for 45–60 minutes. Thereafter it is cooled down to 70° C. over 15 minutes. The dyeing is removed from the bath, rinsed with hot and then with cold water and dried. The result obtained is a grey polyamide dyeing possessing very high lightfastness.

Similarly, the dyestuffs of Examples 2 to 10 or mixtures of the exemplified dyestuffs are employed to print cotton in accordance with the method given in Application Example A. All prints obtained are navy and show good fastness properties.

Application Example B

A dyebath at 40° C., consisting of 4000 parts of water, 1 part of a weakly amphoteric leveling agent which is based on a sulfated, ethoxylated aminopropyl fatty acid amide and which has affinity for dye, 2 parts of the dye of Example 1 and adjusted to pH 6 with 0.5 parts of 40% acetic acid is entered with 100 parts of wool fabric. After 10 minutes at 40° C., the dyebath is heated to boiling at a rate of 1° C. per minute and then left at the boil for 45–60 minutes. Thereafter it is cooled down to 70° C. over 20 minutes. The dyeing is removed from the bath, rinsed with hot and then with cold water and dried. The result obtained is a grey wool dyeing possessing very high lightfastness.

Similarly, the dyestuffs of Examples 2 to 10 or mixtures of the exemplified dyestuffs are employed to print cotton in accordance with the method given in Application Example B. All prints obtained are navy and show good fastness properties.

Application Example C 100 parts if woven nylon-6 material are padded with a 50° C. liquor consisting of
- 40 parts of the dye of Example 1,
- 100 parts of urea,
- 20 parts of a nonionic solubilzer based on butyldiglycol,
- 15–20 parts of acetic acid (to adjust pH to 4),
- 10 parts of weakly cation-active leveling agent which is based on an ethoxylated aminopropyl fatty acid amide and has affinity for dye and
- 810–815 parts of water (to make up to 1000 parts of padding liquor).

The material thus impregnated is rolled up and left to dwell in a steaming chamber under saturated steam conditions at 85–98° C. for 3–6 hours for fixation. Then the dyeing is rinsed with hot and cold water and dried. The result obtained is a grey nylon dyeing having good levelness in the piece and good lightfastness.

Similarly, the dyestuffs of Examples 2 to 10 or mixtures of the exemplified dyestuffs are employed to print cotton in accordance with the method given in Application Example C. All prints obtained are navy and show good fastness properties.

Application Example D

A textile cut pile sheet composed of nylon-6 and having a synthetic base fabric is padded with a liquor containing per 1000 parts
- 2 parts of dye of Example 1
- 4 parts of a commercially available thickener based on carob flour ether
- 2 parts of a nonionic ethylene oxide adduct of a higher alkylphenol
- 1 part of 60% acetic acid.

This is followed by printing with a paste which contains per 1000 parts the following components:
- 20 parts of commercially available alkoxylated fatty alkylamine (displace product)
- 20 parts of a commercially available thickener based on carob flour ether.

The print is fixed for 6 minutes in saturated steam at 100° C., rinsed and dried. The result obtained is a level-colored cover material having a grey and white pattern.

Similarly, the dyestuffs of Examples 2 to 10 or mixtures of the exemplified dyestuffs are employed to print cotton in accordance with the method given in Application Example D. All prints obtained are navy and show good fastness properties.

Application Example E 2.5 parts of the dyestuff obtained in Example 1 are dissolved with stirring at 25° C. in a mixture of 20 parts diethyleneglycol and 77.5 parts water to obtain a printing ink suitable for ink jet printing.

The dyestuffs of Examples 2 to 10 or dyestuff mixtures of Examples 1 to 10 can also be used in a manner analogous to that described in Application Example E.

What is claimed is:

1. A 1:2 chromium complex dye of formula (I):

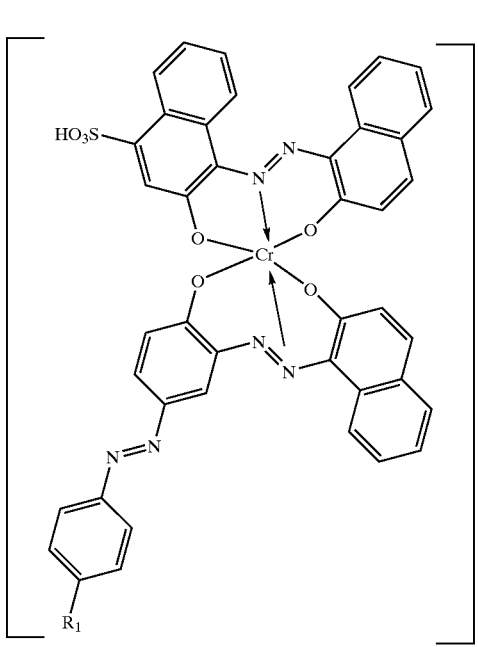

wherein $R_1$ is $O(CH_2)_nOR_2$ or $(CH_2)nOR_2$, $R_2$ is H; linear $C_{1-4}$alkyl; branched $C_{3-4}$alkyl or —$SO_3H$, n is 1, 2, 3 or 4 and K is a cation.

2. A 1:2 chromium complex dye of formula (I) according to claim 1, wherein $R_2$ is H; $CH_3$ or $CH_2CH_3$ and n is 2, 3 or 4.

3. A process for the production of compounds of formula (I) according to claim 1 comprising the step of reacting an azo compound of the formula (II):

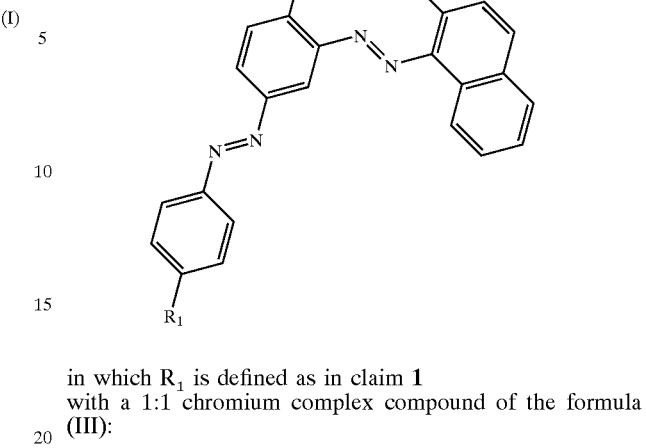

in which $R_1$ is defined as in claim 1
with a 1:1 chromium complex compound of the formula (III):

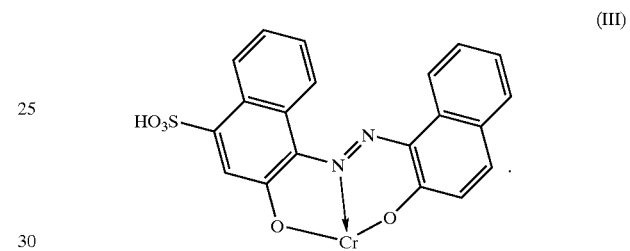

4. An ink-jet ink comprising at least one 1:2 chromium complex dye according to claim 1 or its salt.

5. A process for dyeing a fiber material containing hydroxyl groups or containing nitrogen comprising the step of applying to the fiber material at least one compound according to formula (I), of claim 1, or its salt.

6. A fiber material containing hydroxyl groups or containing nitrogen comprising at least one compound as defined in claim 1, or its salt.

7. A salt of a 1:2 chromium complex dye as claimed in claim 1.

8. A process for printing a fiber material containing hydroxyl groups or containing nitrogen comprising the step of applying to the fiber material at least one compound according to formula (I) of claim 1, or its salt.

* * * * *